(12) United States Patent
Loghry, Sr.

(10) Patent No.: US 10,162,349 B2
(45) Date of Patent: Dec. 25, 2018

(54) SNOW BLOWING APPARATUS

(71) Applicant: John Clifford Loghry, Sr., Des Moines, IA (US)

(72) Inventor: John Clifford Loghry, Sr., Des Moines, IA (US)

( * ) Notice: Subject to any disclaimer, the term of this patent is extended or adjusted under 35 U.S.C. 154(b) by 0 days.

(21) Appl. No.: 15/805,103

(22) Filed: Nov. 6, 2017

(65) Prior Publication Data
US 2018/0307224 A1 Oct. 25, 2018

Related U.S. Application Data

(60) Provisional application No. 62/488,126, filed on Apr. 21, 2017.

(51) Int. Cl.
*G05D 1/00* (2006.01)
*E01H 5/09* (2006.01)

(52) U.S. Cl.
CPC .......... *G05D 1/0016* (2013.01); *E01H 5/098* (2013.01); *G05D 1/0022* (2013.01); *G05D 1/0038* (2013.01); *G05D 1/0055* (2013.01)

(58) Field of Classification Search
CPC ........ A01D 34/008; G05D 1/021; G05D 1/02; G05D 1/00; G05D 1/0011; G05D 1/0022; G05D 1/0033; G05D 1/0038; G05D 1/0044; G05D 1/0055; G05D 1/0016; E01H 5/098
See application file for complete search history.

(56) References Cited

U.S. PATENT DOCUMENTS

| | | | | |
|---|---|---|---|---|
| 5,746,261 A * | 5/1998 | Bowling | ................ | A01B 13/00 144/24.12 |
| 6,600,981 B2 * | 7/2003 | Ruffner | ................ | A01B 69/008 56/16.4 A |
| 6,611,738 B2 * | 8/2003 | Ruffner | ................ | A01B 69/008 318/581 |
| 7,103,457 B2 * | 9/2006 | Dean | ..................... | A01D 34/008 318/568.12 |
| 7,107,132 B2 * | 9/2006 | Dean | ..................... | A01D 34/008 318/568.12 |
| 7,418,328 B2 * | 8/2008 | Romig | ................. | A01D 34/008 180/253 |
| 8,634,960 B2 * | 1/2014 | Sandin | ................... | G05D 1/028 56/10.2 E |
| 2004/0195357 A1 * | 10/2004 | Doherty | ................ | A01C 17/00 239/172 |
| 2005/0204587 A1 * | 9/2005 | Kime | ........................ | E01H 5/06 37/266 |
| 2014/0180478 A1 * | 6/2014 | Letsky | .................... | E01H 5/098 700/258 |
| 2015/0007541 A1 * | 1/2015 | Albinger | ................ | A01D 69/02 56/10.2 A |

(Continued)

FOREIGN PATENT DOCUMENTS

WO WO-2017133708 A1 * 8/2017 ............... E01H 5/08

*Primary Examiner* — Jamie L McGowan
(74) *Attorney, Agent, or Firm* — RG Patent Consulting, LLC; Rachel Gilboy

(57) ABSTRACT

An improved snow blower apparatus is a snow blower that is able to be remotely controlled by a user located at a remote location. At least one video camera located on the snow blower allows the user to view the environment around the snow blower for safety purposes and to control the direction of travel and speed of the apparatus.

14 Claims, 4 Drawing Sheets

(56) References Cited

U.S. PATENT DOCUMENTS

| | | | |
|---|---|---|---|
| 2015/0128547 A1* | 5/2015 | Einecke | A01D 34/008 56/10.2 A |
| 2018/0024549 A1* | 1/2018 | Hurd | G05D 1/0022 |
| 2018/0129199 A1* | 5/2018 | Gustavsson | G05D 1/0044 |
| 2018/0217587 A1* | 8/2018 | Gates | G05D 1/0022 |

* cited by examiner

SNOW BLOWING APPARATUS

CROSS-REFERENCE TO RELATED APPLICATION

The present application is related to and claims priority from prior provisional application Ser. No. 62/488,126, filed Apr. 21, 2017 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of snow blowers and more specifically relates to an improved snow blower apparatus.

2. Description of the Related Art

In some regions of the country, temperatures tend to be much colder and precipitation tends to be much higher than in other regions. While these regions have specific advantages for those that enjoy winter sports and activities, they also have some distinct disadvantages. One of the disadvantages is the constant wintertime snowfall on roadways and sidewalks. Home owners must keep sidewalks and often roadways adjacent to the residence cleared for safety and convenience. Driveways tend to get covered in deep snow, that in a short amount of time, can block vehicles from entering to park or from leaving once the vehicle is parked. To keep these areas clean, the common way to clear them is by laboriously shoveling the snow far enough away from sidewalks and driveways to not be a problem. The task in not without hazards either. The danger of slipping and falling on ice and becoming injured is always present. The labor is almost always tiring and painful. It is a special problem for those with health issues that interfere, which complicates the task.

Snow blowers were designed to take away most of the labor involved. A snow blower is usually a gas powered machine with a snow scoop at ground level and a discharge chute at the top. A rotating blade picks up the snow when it enters the scoop and throws or shoots the snow out of the discharge chute at an angle far enough to clear the area being cleared. Some snow blowers are self driven and some need to be pushed by the user. While they are labor reducing, they still consume time and the labor of pushing, pulling, and turning. A solution that could reduce or eliminate even this labor and time would be welcomed.

Ideally, a snow blower should provide automated and remote control, and yet, would operate reliably and be manufactured at a modest expense. Thus, a need exists for a reliable improved snow blower apparatus to avoid the above-mentioned problems.

BRIEF SUMMARY OF THE INVENTION

In view of the foregoing disadvantages inherent in the known snow blower art, the present invention provides a novel improved snow blower apparatus. The general purpose of the present invention, which will be described subsequently in greater detail, is to provide automated and remote control use.

An improved snow blowing apparatus may comprise a housing, a pair of rear wheels rotatably connected to a rear portion of the housing, an intake portion connected to a front portion of the housing opposite the rear portion, an impeller member rotatably connected to the housing via a center pivot member and mechanically connected to the pair of rear wheels, an impeller motor connected to the housing and mechanically and operatively connected to and able to rotate the pair of rear wheels to thereby propel the improved snow blowing apparatus, a pivot motor connected to the housing and mechanically and operatively connected to the center pivot member to thereby pivot the center pivot member and the pair of rear wheels for steering the improved snow blowing apparatus, a microcontroller including a computer member having computer software adapted to control the impeller motor and the pivot motor and allow a user to control the motors and control the movements of the improved snow blowing apparatus via the computer member.

The microcontroller is connected to the housing and the computer member is electrically connected to the impeller motor and the pivot motor. A transceiver is adapted to send and receive electronic signals from a remote control device which is electrically connected to the computer member. The remote control device includes a computer member having computer software adapted to communicate with the computer software of the microcontroller.

A transceiver is adapted to send and receive electronic signals from the microcontroller. The remote control device is adapted to be used remotely to control the movement and operation of the improved snow blowing apparatus. The impeller motor and the pivot motor are formed as electric rechargeable motors. The electric rechargeable motors are formed as high torque 24 volt motors.

The microcontroller and the remote control device are adapted to communicate to each other via wifi. The microcontroller further includes an emergency shut off switch adapted to shut off the impeller motor and the pivot motor when predetermined criteria are met. A video camera is connected to the housing and electrically connected to the microcontroller and the video camera is adapted to send video images to the remote control device.

At least one power source is connected to the housing and connected to the microcontroller, the impeller motor, and the pivot motor. The power source(s) is/are formed as at least one battery member that is electrically connected to the microcontroller, the impeller motor, and the pivot motor. The housing is formed from material chosen from the list of materials consisting of steel, stainless steel, and aluminum. The remote control device may be formed as a smart phone. The remote control device includes touch-screen technology and a video screen.

A snow gathering mechanism is mechanically connected to the intake portion and adapted to gather snow and move the snow into an ejection chute. The ejection chute is connected to a top portion of the housing and adapted to receive snow from the snow gathering mechanism and eject the snow away from the improved snow blowing apparatus. The ejection chute is rotatably connected to the housing such that the snow can be ejected in predetermined directions.

The present invention holds significant improvements and serves as an improved snow blower apparatus. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, improved snow blower apparatus constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a snow blower and more particularly to an improved snow blower apparatus as used to improve the automated and remote control use.

Generally speaking, an improved snow blower apparatus is a snow blower that is able to be remotely controlled by a user located at a remote location. At least one video camera located on the snow blower allows the user to view the environment around the snow blower for safety purposes and to control the direction of travel and speed of the apparatus.

Figure 1:
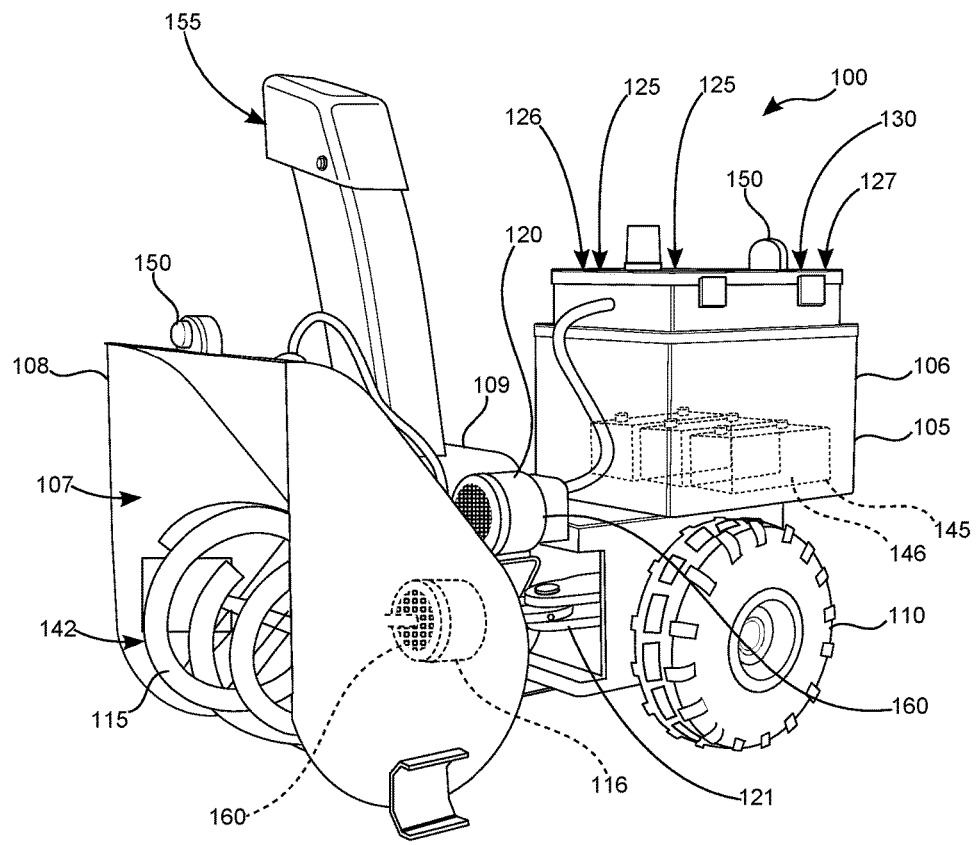
FIG. 1 shows a perspective view illustrating an improved snow blower apparatus according to an embodiment of the present invention.

Referring to the drawings by numerals of reference there is shown in FIG. 1, a perspective view illustrating improved snow blowing apparatus 100 according to an embodiment of the present invention.

Improved snow blowing apparatus 100 may comprise housing 105, a pair of rear wheels 110 rotatably connected to rear portion 106 of housing 105, intake portion 107 connected to front portion 108 of housing 105 opposite rear portion 106, impeller member 115 rotatably connected to housing 105 via center pivot member 121 and mechanically connected to the pair of rear wheels 110, impeller motor 116 connected to housing 105 and mechanically and operatively connected to and able to rotate the pair of rear wheels 110 to thereby propel improved snow blowing apparatus 100, pivot motor 120 connected to housing 105 and mechanically and operatively connected to center pivot member 121 to thereby pivot center pivot member 121 and the pair of rear wheels 110 for steering improved snow blowing apparatus 100, microcontroller 125 including computer member 126 having computer software 127 adapted to control impeller motor 116 and pivot motor 120 and allow a user to control impeller motor 116 and control the movements of improved snow blowing apparatus 100 via computer member 126.

Figure 2:
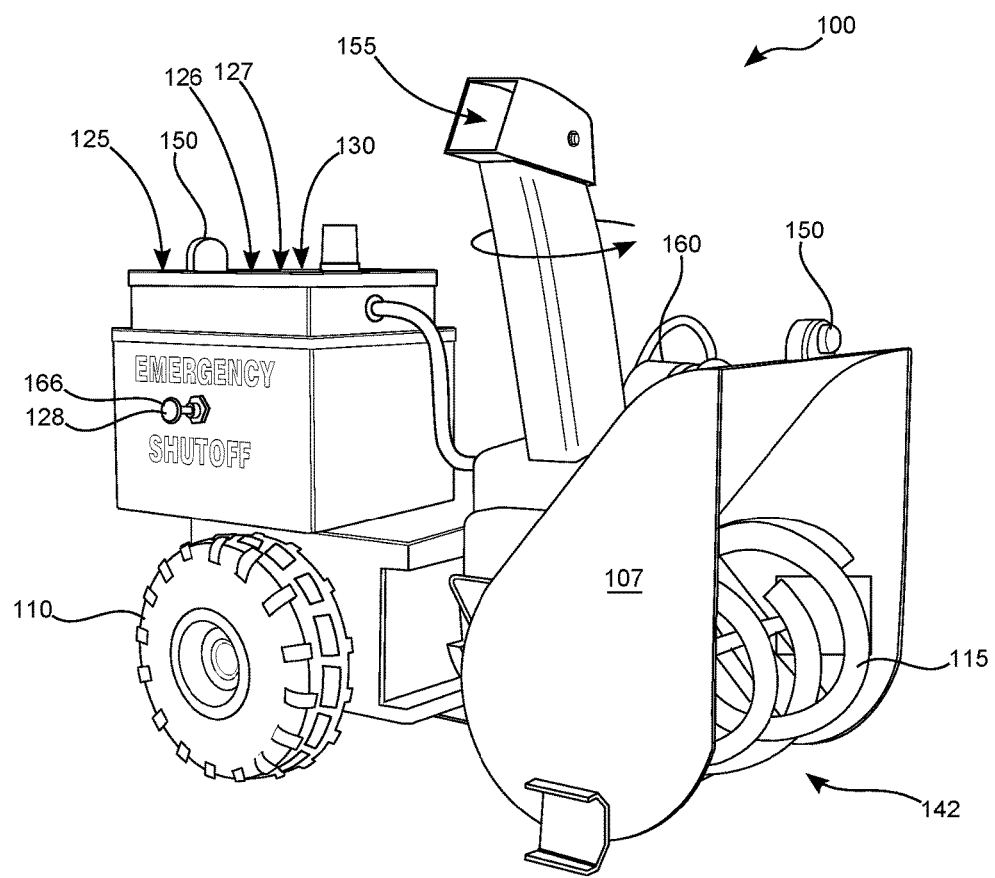
FIG. 2 is a perspective view illustrating the improved snow blower apparatus according to an embodiment of the present invention of FIG. 1.

Referring now to FIG. 2, is a perspective view illustrating improved snow blowing apparatus 100 according to an embodiment of the present invention of FIG. 1.

At least one power source 145 is connected to housing 105 and connected to microcontroller 125, impeller motor 116, and pivot motor 120. Power source(s) 145 is/are formed as at least one battery member 146 that is electrically connected to microcontroller 125, impeller motor 116, and pivot motor 120. Housing 105 is formed from material chosen from the list of materials consisting of steel, stainless steel, and aluminum. Remote control device 135 may be formed as smart phone 139. Remote control device 135 includes touch-screen technology and video screen 140. Microcontroller 125 is connected to housing 105 and computer member 126 is electrically connected to impeller motor 116 and pivot motor 120. Transceiver 130 is adapted to send and receive electronic signals from remote control device 135 which is electrically connected to computer member 126. Remote control device 135 includes computer member 136 having computer software 137 adapted to communicate with computer software 127 of microcontroller 125.

Figure 3:
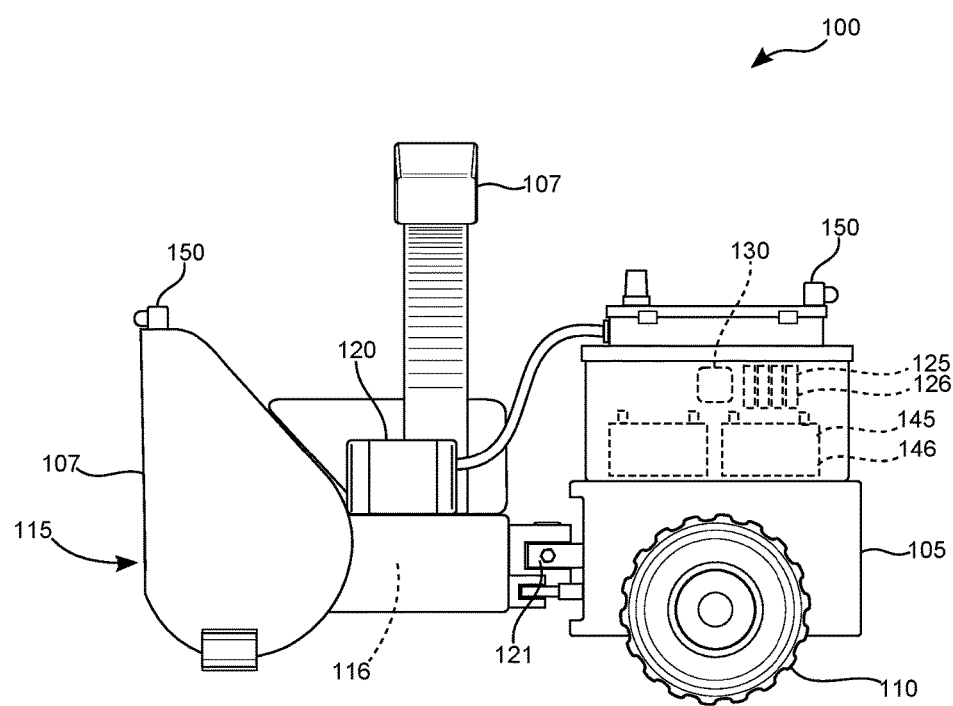
FIG. 3 is a side view illustrating the improved snow blower apparatus according to an embodiment of the present invention of FIG. 1.

Referring now to FIG. 3, is a side view illustrating improved snow blowing apparatus 100 according to an embodiment of the present invention of FIG. 1.

Transceiver 130 is adapted to send and receive electronic signals from microcontroller 125. Remote control device 135 is adapted to be used remotely to control the movement and operation of improved snow blowing apparatus 100. Impeller motor 116 and pivot motor 120 are formed as electric rechargeable motors which may be formed as high torque 24 volt motors.

Snow gathering mechanism 142 is mechanically connected to intake portion 107 and adapted to gather snow and move the snow into ejection chute 155. Ejection chute 155 is connected to top portion 109 of housing 105 and adapted to receive snow from snow gathering mechanism 142 and eject the snow away from improved snow blowing apparatus 100. Ejection chute 155 is rotatably connected to housing 105 such that the snow can be ejected in predetermined directions.

Figure 4:
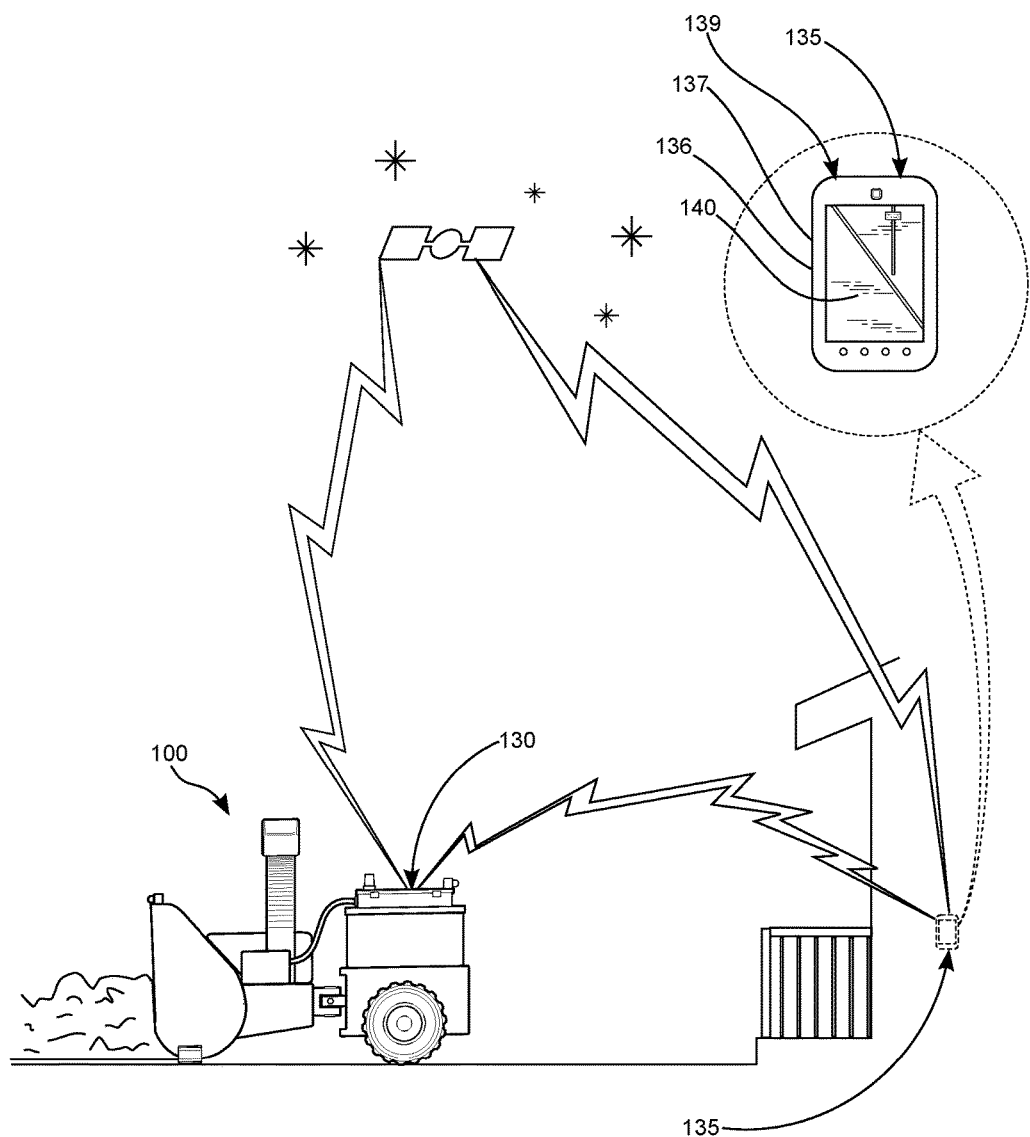
FIG. 4 is a diagram illustrating the improved snow blower apparatus according to an embodiment of the present invention of FIG. 1.

Referring now to FIG. 4, is a diagram illustrating improved snow blowing apparatus 100 according to an embodiment of the present invention of FIG. 1.

Microcontroller 125 and remote control device 135 are adapted to communicate to each other via wifi. Microcontroller 125 further includes emergency shut off switch 165 adapted to shut off impeller motor 116 and pivot motor 120 when predetermined criteria are met. Emergency shut off switch 165 may be in the form of pushbutton 166 located on the exterior of housing 105 to shut down improved snow blowing apparatus 100 for safety reasons in the event of an impending collision, which may be used by a person in proximity to improved snow blowing apparatus 100 that does not have computer member 126 control. The predetermined criteria may be detection of a solid or moving object within a predetermined distance to a proximity switch. The shutdown may also be activated by a motion sensor. The motion sensor activation may also be programmed to only activate a momentary pause command. Video camera 150 is connected to housing 105 and electrically connected to microcontroller 125 and video camera 150 is adapted to send video images to remote control device 135. Computer member 126, in some embodiments, may be able to receive operating instructions including patterns of travel and distances or GPS coordinates for the machine to operate within so the machine can operate on pre-programmed commands or in conjunction with a Global Positioning system (GPS). This feature, is so equipped, allows the remote user to not have to constantly control improved snow blowing apparatus 100. These features may be used on commercial embodiments but may also be used on home embodiments as well. Proximity sensors on improved snow blowing apparatus 100 may be user programmed to override remote control or may just send a warning to remote control device 135 so that a user may steer improved snow blowing apparatus 100 away from objects or stop improved snow blowing apparatus 100 to avoid accidents. A second feature, if operated in automatic mode, may be to stop and return operation to the remote operator for manual control until the remote operator verifies the safety of the surroundings through video camera 150 and then remotely signals improved snow blowing apparatus 100 to resume. Improved snow blowing apparatus 100 may be operated, in this embodiment, via satellite by the user instead of via line-of-sight radio frequency control. Improved snow blowing apparatus 100 may have both features, of which the user may choose one from a menu. The chosen operation method may remain in effect until it is changed by the user. This function may allow the user to clear snow from off of long streets and/or long driveways, and parking lots or even airport runways in commercial use.

Improved snow blower apparatus 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other assembly arrangements such as, for example, including more or less components, customized parts, different color combinations, parts may be sold separately, etc., may be sufficient.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An improved snow blowing apparatus comprising:
   a housing;
   a pair of rear wheels;
      wherein said pair of rear wheels are rotatably connected to a rear portion of said housing;
   an intake portion;
      wherein said intake portion is connected to a front portion of said housing opposite said rear portion;
   an impeller member;
      wherein said impeller member is rotatably connected to said housing via a center pivot member and mechanically connected to said pair of rear wheels;
   an impeller motor;
      wherein said impeller motor is connected to said housing and mechanically and operatively connected to and rotates said pair of rear wheels to thereby propel said improved snow blowing apparatus;
   a pivot motor;
      wherein said pivot motor is connected to said housing and mechanically and operatively connected to said center pivot member to thereby pivot said center pivot member and thereby said pair of rear wheels for steering said improved snow blowing apparatus;
   a microcontroller including:
      a computer member including:
         computer software adapted to control said impeller motor and
      said pivot motor and allow a user to control said motors and control the movements of said improved snow blowing apparatus via said computer member;
      wherein said microcontroller is connected to said housing and said computer member is electrically connected to said impeller motor and said pivot motor; and
   a transceiver:
      wherein said transceiver is adapted to send and receive electronic signals from a remote control device, and is
   electrically connected to said computer member; and
   a remote control device including;
      a computer member including;
         computer software adapted to communicate with said computer software of said microcontroller; and
      a transceiver:
         wherein said transceiver is adapted to send and receive electronic signals from said microcontroller;
      wherein said remote control device is adapted to be used remotely to control the movement and operation of said improved snow blowing apparatus.

2. The improved snow blowing apparatus of claim 1, wherein said impeller motor and said pivot motor are formed as electric rechargeable motors.

3. The improved snow blowing apparatus of claim 2, wherein said electric rechargeable motors are formed as high torque 24 volt motors.

4. The improved snow blowing apparatus of claim 1, wherein said microcontroller and said remote control device are adapted to communicate to each other via WiFi.

5. The improved snow blowing apparatus of claim 1, wherein said microcontroller further includes an emergency shut off switch adapted to shut off said impeller motor and said pivot motor when predetermined criteria are met.

6. The improved snow blowing apparatus of claim 1, further comprising a video camera connected to said housing and electrically connected to said microcontroller; wherein said video camera is adapted to send video images to said remote control device.

7. The improved snow blowing apparatus of claim 1, further comprising at least one power source connected to said housing and connected to said microcontroller, said impeller motor, and said pivot motor.

8. The improved snow blowing apparatus of claim 7, wherein said at least one power source is formed as at least one battery member electrically connected to said microcontroller, said impeller motor, and said pivot motor.

9. The improved snow blowing apparatus of claim 1, wherein said housing is formed from a material chosen from a list of materials consisting of steel, stainless steel, and aluminum.

10. The improved snow blowing apparatus of claim 1, wherein said remote control device is formed as a smart phone.

11. The improved snow blowing apparatus of claim 1, wherein said remote control device includes touch-screen technology and a video screen.

12. The improved snow blowing apparatus of claim 1, further comprising a snow gathering mechanism mechanically connected to said intake portion and adapted to gather snow and move said snow into an ejection chute.

13. The improved snow blowing apparatus of claim 12, further comprising an ejection chute connected to a top portion of said housing and adapted receive snow from said snow gathering mechanism and eject said snow away from said improved snow blowing apparatus.

14. The improved snow blowing apparatus of claim 13, wherein said ejection chute is rotatably connected to said housing such that said snow can be ejected in predetermined directions.

* * * * *